United States Patent
Thom et al.

(10) Patent No.: US 7,934,096 B2
(45) Date of Patent: Apr. 26, 2011

(54) INTEGRITY PROTECTED SMART CARD TRANSACTION

(75) Inventors: Stefan Thom, Snohomish, WA (US); Erik Lee Holt, Redmond, WA (US); Shivaram H. Mysore, Kirkland, WA (US); Valerie Kathleen Bays, Redmond, WA (US); Carl M. Ellison, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 927 days.

(21) Appl. No.: 11/829,737

(22) Filed: Jul. 27, 2007

(65) Prior Publication Data

US 2009/0031408 A1   Jan. 29, 2009

(51) Int. Cl.
*H04L 9/32* (2006.01)
*H04L 29/06* (2006.01)
*G06F 21/00* (2006.01)
*G06F 7/04* (2006.01)

(52) U.S. Cl. ............ 713/172; 713/185; 713/193; 726/9; 726/20; 726/27; 725/30; 725/6; 902/1; 902/2; 902/3; 902/4; 902/5

(58) Field of Classification Search ................ 726/9, 20; 713/172, 185
See application file for complete search history.

(56) References Cited

U.S. PATENT DOCUMENTS

| 5,196,840 | A | * | 3/1993 | Leith et al. | 340/5.26 |
| 5,724,423 | A | * | 3/1998 | Khello | 713/184 |
| 7,178,025 | B2 | * | 2/2007 | Scheidt et al. | 713/168 |
| 7,624,272 | B2 | * | 11/2009 | Wiseman et al. | 713/176 |
| 7,673,795 | B2 | * | 3/2010 | Millett et al. | 235/382 |
| 2004/0103299 | A1 | * | 5/2004 | Zimmer et al. | 713/200 |
| 2006/0085848 | A1 | * | 4/2006 | Aissi et al. | 726/9 |
| 2007/0118891 | A1 | * | 5/2007 | Buer | 726/8 |

* cited by examiner

*Primary Examiner* — Taghi T. Arani
*Assistant Examiner* — Mohammad L Rahman
(74) *Attorney, Agent, or Firm* — L. Alan Collins; Collins & Collins Incorporated

(57) ABSTRACT

Systems, methods, and technologies for configuring a conventional smart card and a client machine, and for performing a smart card authorization using the configured smart card and client. Further, the combination of methods provides for mutual authentication—authentication of the client to the user, and authentication of the user to the client. The authentication methods include presenting a specified token to the user sufficient to authenticate the client to the user and thus protect the user-provided PIN. Security is strengthened by using an integrity key based on approved client system configurations. Security is further strengthened by calculating a PIN' value based on a user-specified PIN and a modifier and using the PIN' value for unlocking the smart card.

9 Claims, 6 Drawing Sheets

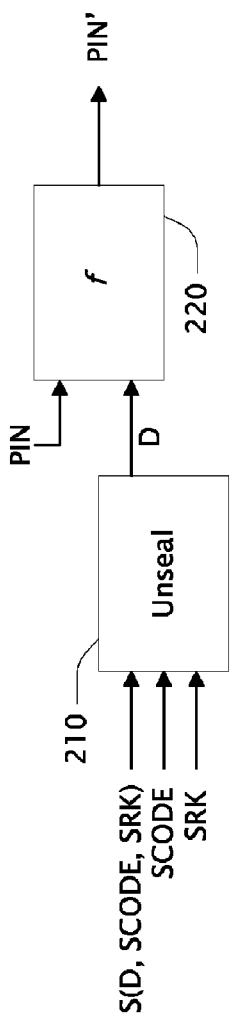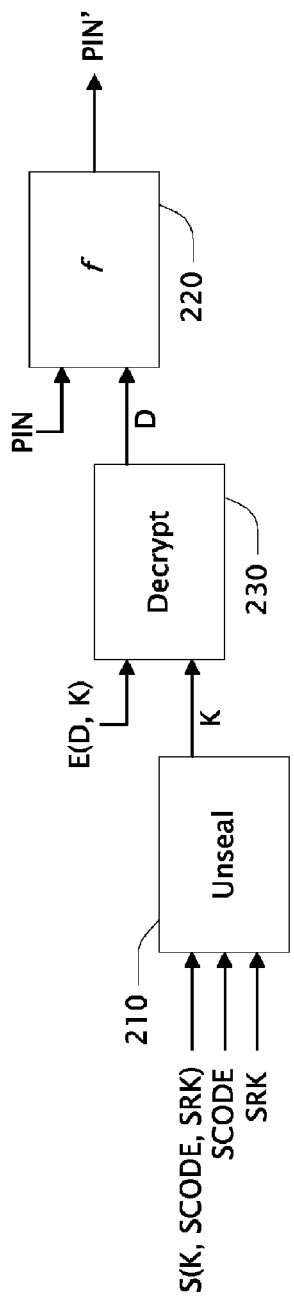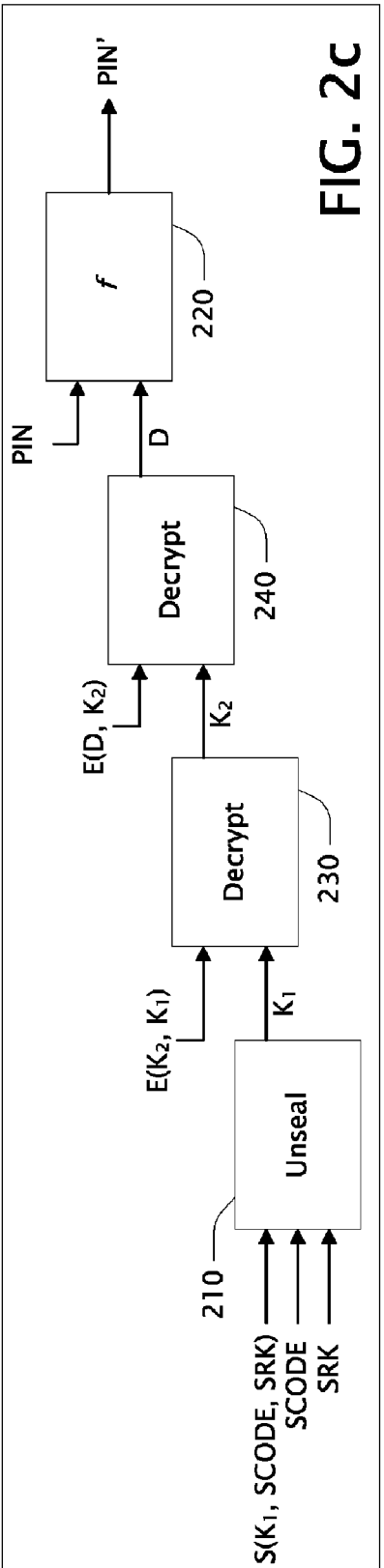

INTEGRITY PROTECTED SMART CARD TRANSACTION

BACKGROUND

Smart cards are increasingly popular as a means of strengthening user authentication and the like. Smart cards are typically configured with a user-specified personal identification number ("PIN"). For a user to authenticate using a smart card it is typically inserted into a card reader of a client machine and the user enters a corresponding PIN. Thus the user must possess the card and know the PIN in order to authenticate. Even so, the user must trust the client—that it has not been compromised and will properly and securely make use of the PIN to unlock the smart card and thus access the cryptographic data for authentication and the like.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide systems, methods, and technologies for configuring a conventional smart card and a client machine, and for performing a smart card authorization using the configured smart card and client. Further, the combination of methods provides for mutual authentication—authentication of the client to the user, and authentication of the user to the client. The authentication methods include presenting a specified token to the user sufficient to authenticate the client to the user and thus protect the user-provided PIN. Security is strengthened by using an integrity key based on approved client system configurations. Security is further strengthened by calculating a PIN' value based on a user-specified PIN and a modifier and using the PIN' value for unlocking the smart card.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein:

FIGS. 2a through 2c are block diagrams showing schematics of example systems for providing integrity protected smart card transactions.

FIG. 2a is a block diagram showing a basic system for providing integrity protected smart card transactions.

FIG. 2b is a block diagram showing a basic system for providing integrity protected smart card transactions including an additional decryption step.

FIG. 2c is a block diagram showing a basic system for providing integrity protected smart card transactions including multiple additional decryption steps.

Like reference numerals are typically used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing environment, the environments described are provided as examples and not limitations. As those skilled in the art will appreciate, the present examples are suitable for application in a variety of different types of computing environments.

In general, the term "key" as used herein typically refers to conventional cryptographic keys, such as a public-private key pair or the like. Such keys typically include and/or utilize public and private key properties, certificates and certificate chains, validation techniques, and the like as known to those skilled in the art.

Figure 1B:
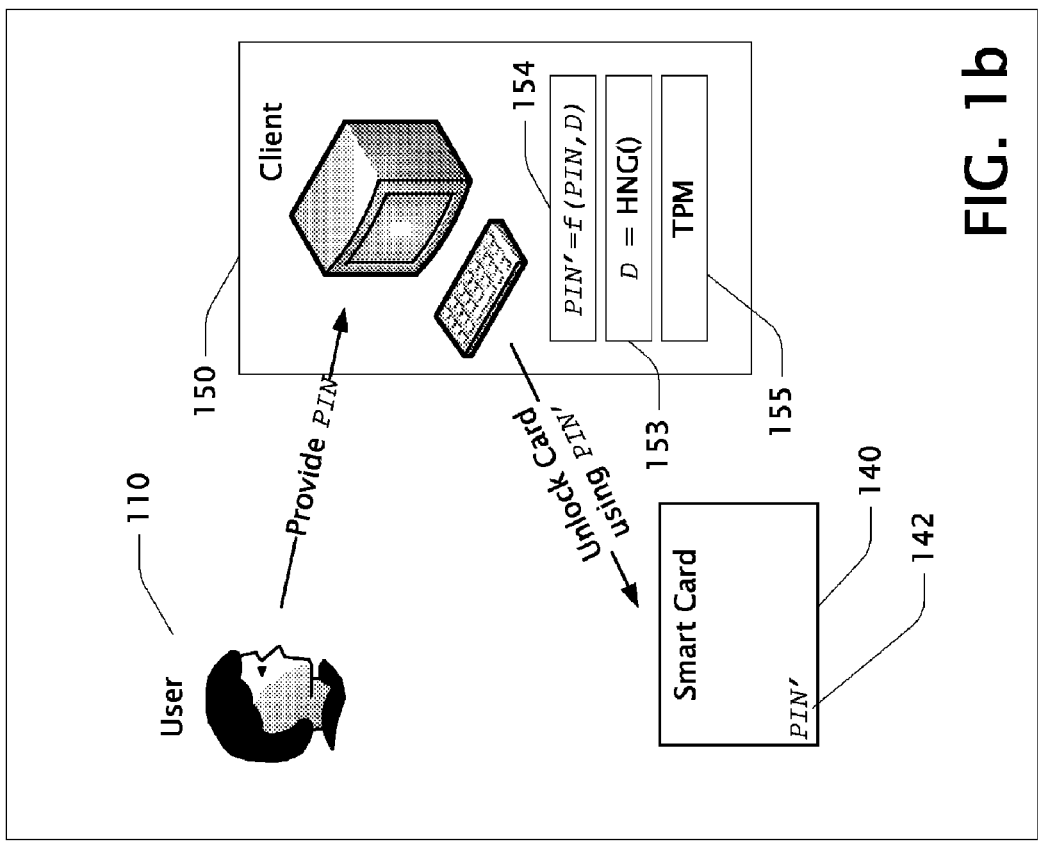
FIG. 1b is a block diagram showing an example modified client for utilizing a conventional smart card.
Figure 1A:
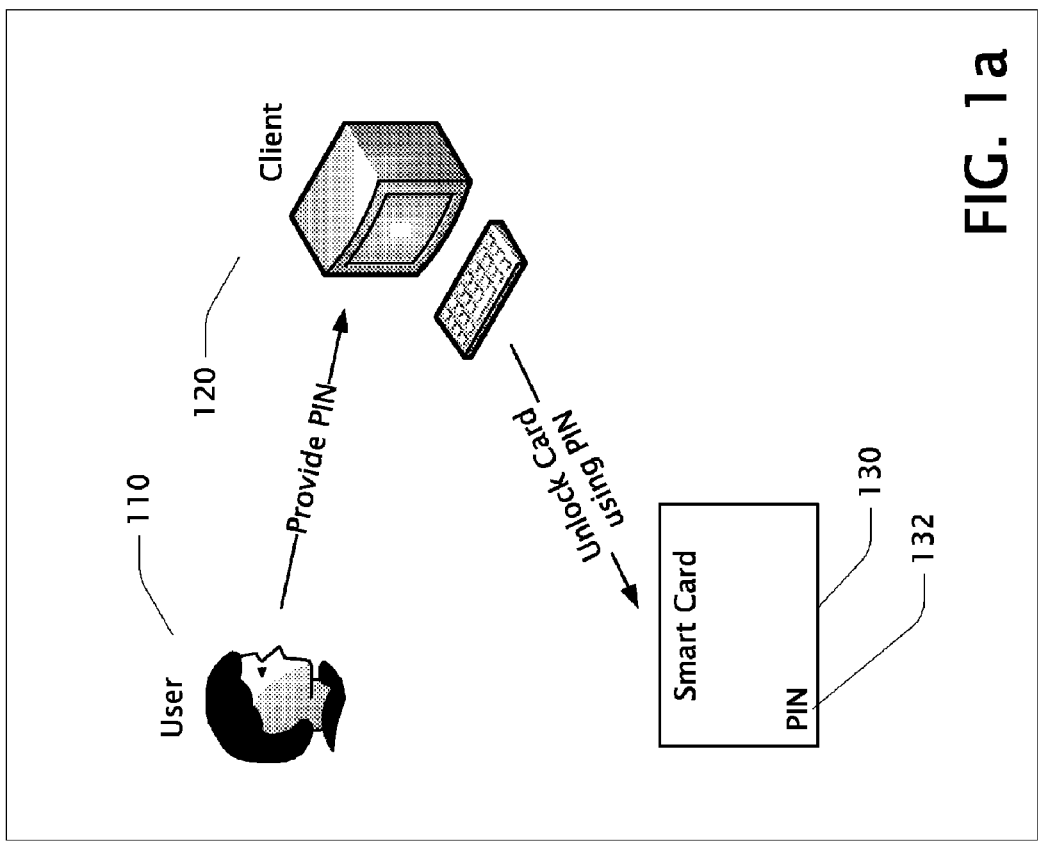
FIG. 1a is a block diagram showing an example conventional client 120, such as the computing environment described in connection with FIG. 6, for utilizing a conventional smart card.

FIG. 1a is a block diagram showing an example conventional client 120, such as computing environment 600 described in connection with FIG. 6, for utilizing a conventional smart card 130. Client 120 typically includes a means for communicating with and/or reading smart card 130, such as a card reader and corresponding drivers, software, and/or the like. Client 120 typically accepts a personal identification number ("PIN") from user 110 that client 120 typically passes to smart card 130 as part of a conventional PIN validation process. If the user-provided PIN corresponds to PIN 132 stored on smart card 130, then smart card 130 is typically "unlocked" and certificates, cryptographic keys ("keys"), and/or the like stored on the card are made available to client 120, typically for purposes of user identification and/or authentication, providing network logon credentials, tokens, and the like. Note that user 110 is typically a person, but may alternatively be any system, device, entity, or the like, or combination of such able to make use of such a card or device of similar or equivalent functionality, such as a vehicle, animal, robot, ship, or any other suitable object or entity. Note further that a "user-provided" PIN is typically a PIN associated with a particular smart card, known to the user of that smart card, and typically provided by the user when attempting to use the smart card.

Smart card 130 is typically a conventional smart card, also known as a chip card or integrated circuit card ("ICC"), and is typically of the memory card and/or microprocessor card types. Smart card 130 typically securely stores a PIN that must correspond to or match a user-provided PIN in order to "unlock" the card, thus providing access to cryptographic information and the like securely stored on the card.

Various brands of smart cards make use of different PIN formats. One example of a PIN format is a four-digit number, such as "1234". An alternative PIN format may be a character string of up to n characters in length, where n is some integer.

Most advanced smart cards are equipped with specialized cryptographic hardware that provide for the use of algorithms such as Rivest-Shamir-Adleman ("RSA") and Digital Signature Algorithm ("DSA") and the like. Such a smart card typically includes means for securely storing various data for use once the smart card is unlocked, such as certificates, keys, tokens, encrypted blobs, etc. Such data is typically securely stored on the smart card during a personalization process for a particular user. The term "securely stored" as used herein typically refers to conventional secure storage mechanisms and means utilized with conventional smart cards.

FIG. 1b is a block diagram showing an example modified client 150 for utilizing a conventional smart card 140. System 150 may be a conventional computing environment, such as computing environment 600 described in connection with FIG. 6, that further includes a prime PIN ("PIN'") calculator ("PPCALC") 154, a high-entropy number generator ("HNG") 153, and a trusted platform module ("TPM") 155 such as TPM 618 described in connection with FIG. 6.

Example PPCALC 154 is a PIN' calculator operable to generate a PIN' value based on a user-provided PIN and a high-entropy number 'D' as defined by the function 'f' of the form:

$$PIN'=f(PIN,D)$$

where PIN is the user-provided PIN and D is a high-entropy number. Function f may be any function that accepts inputs PIN and D, mixes them thoroughly, and produces output PIN' such that given PIN and D input values always produce the same PIN' output value. Further, it is desirable that unique values of inputs PIN and/or D result in a unique output value PIN'. Finally, it is desirable that function f produces values of PIN' that conform to PIN format requirements of smart card 140.

In one example, function f is a cryptographic hash function of inputs PIN and D. PPCALC 154 converts the output hash value by some radix to a sequence of digits or characters. Such a conversion may be part of function f. For example, given radix 26, the converted hash is a PIN' value consisting of letters of one case (e.g., all lower case letters). Alternatively, given radix 62, the converted hash is a PIN' value consisting of letters in both cases and the digits. Many other alternative encodings are also possible, or the hash value may be used directly, typically depending on the PIN format accepted by the smart card. The output PIN' can be up to the maximum length of the PIN format supported by the brand of smart card being used.

Example HNG 153 typically generates a high-entropy modifier or number D of substantial cryptographic length (e.g., 128 bits or larger). High-entropy number D is typically held secret in TPM 155 of client 150, also known as being "sealed" to client 150 via TPM 155. In one example, client 150 is a computing environment being logged into by user 110. Alternatively, HNG 153 may accept a value of D via policy or the like. For example, enterprise policy dictates that each user in the enterprise may only log into his own machine; thus each machine would typically hold secret a unique value of D. In another example, enterprise policy dictates that any user in the enterprise may log into any enterprise machine; thus every machine in the enterprise would typically hold secret the same value of D.

Example TPM 155 typically monitors the system configuration of client 150 and holds tamperproof a system code ("SCODE") that represents the state of the system, or the system configuration, the last time the system was booted or the like. If the system configuration has changed since the last time client 150 was booted, a new SCODE is calculated and held secret by TPM 155. In one example, the SCODE is a value that uniquely identifies the system configuration of client 150. The system configuration typically includes the hardware configuration and operating system elements of client 150. The system configuration monitored by TPM 155 may vary; it may include pre-boot and/or post-boot elements, and/or any other aspects of system configuration.

Example modified client 150 typically accepts a personal identification number ("PIN") from user 110. Client 150 typically passes this user-provided PIN to PPCALC 154 which calculates PIN' based on the user-provided PIN and a value D provided by TPM 155, the calculation based on a function of the form PIN'=f(PIN, D). The resulting PIN' value is passed to smart card 130. If the current system configuration of client 150 is approved and the user-provided PIN is correct, the resulting value of PIN' will correspond to PIN' 142 stored on smart card 140 and smart card 140 is thus "unlocked". In this manner, if the system configuration has changed or is not approved then the smart card will not be unlocked, even if the user-provided PIN is correct. Further, attempting to use a smart card including a PIN' 142 (as opposed to a PIN 132 that is identical to the user-provided PIN) with a conventional client such as described in connection with FIG. 1a, even with the correct user-provided PIN, will fail as the client is unable to generate the correct PIN' value. Yet further, if user 110 attempts to use smart card 140 with an unapproved client, such as a modified client 150 that is not approved, then smart card 140 will not be successfully unlocked because the client will not be provisioned with the correct value of D.

FIGS. 2a through 2c are block diagrams showing schematics of example systems for providing integrity protected smart card transactions. Each system includes an unseal module 210 as well as a function f module 220. In one example, the functionality of unseal module 210 is provided by TPM 155 as described in connection with FIG. 1b, and the functionality of function f module 220 is provided by PPCALC 154 as described in connection with FIG. 1b. Each example system, given the correct secret, keys, and user-provided PIN inputs, generates a PIN' value sufficient to unlock a previously configured smart card, such as configured during the user enrollment method described in connection with FIG. 3.

Module 210 typically accepts three input parameters: secret S, system code SCODE, and storage root key SRK. The output of module 210 is the value D, or an error if one of the input values is invalid. Unseal module 210 generally performs the inverse operation of a seal operation in which secret S is generated based on inputs D, SCODE, and SRK, as described in connection with FIGS. 1b and 4. Secret S is also known herein as S (D, SCODE, SRK) and as an "integrity key". Note that in one example, as described in connection with FIG. 4, the SRK is typically held secret by the TPM (module 210).

FIG. 2a is a block diagram showing a basic system for providing integrity protected smart card transactions. Given a valid secret S, system code SCODE, and storage root key, SRK, unseal module 210 generates a number D. The number D along with the correct user-provided PIN are processed by module 220 resulting in PIN' usable to unlock the smart card. This system provides a PIN' value for unlocking the smart card only if the user-provided PIN is correct and the secret S has not been tampered with, and the client is approved with a proper system configuration as reflected by the SCODE input.

FIG. 2b is a block diagram showing a basic system for providing integrity protected smart card transactions including an additional decryption step. In this system, unseal module 210 generates a key value K rather than the number D. Then decrypt module 230 typically accepts as input parameters the key K along with an encrypted value of the number D or E(D,K). If the input parameters are correct, module 230 produces the number D which is used by module 220 to generate the correct PIN'. This variation of the system allows for many different clients to be validated based on the same number D by maintaining an E(D,K) for each approved client system configuration.

FIG. 2c is a block diagram showing a basic system for providing integrity protected smart card transactions including multiple additional decryption steps. In this example, the unseal module 210 produces a first key $K_1$ which is decrypted by module 230 to produce a second key $K_2$ which is used, along with the user-supplied PIN, to generate the correct PIN'. Alternatively, further levels of decryption may be used resulting in key $K_n$ which may then be used, along with the user-supplied PIN, to produce the correct PIN'.

Figure 3:
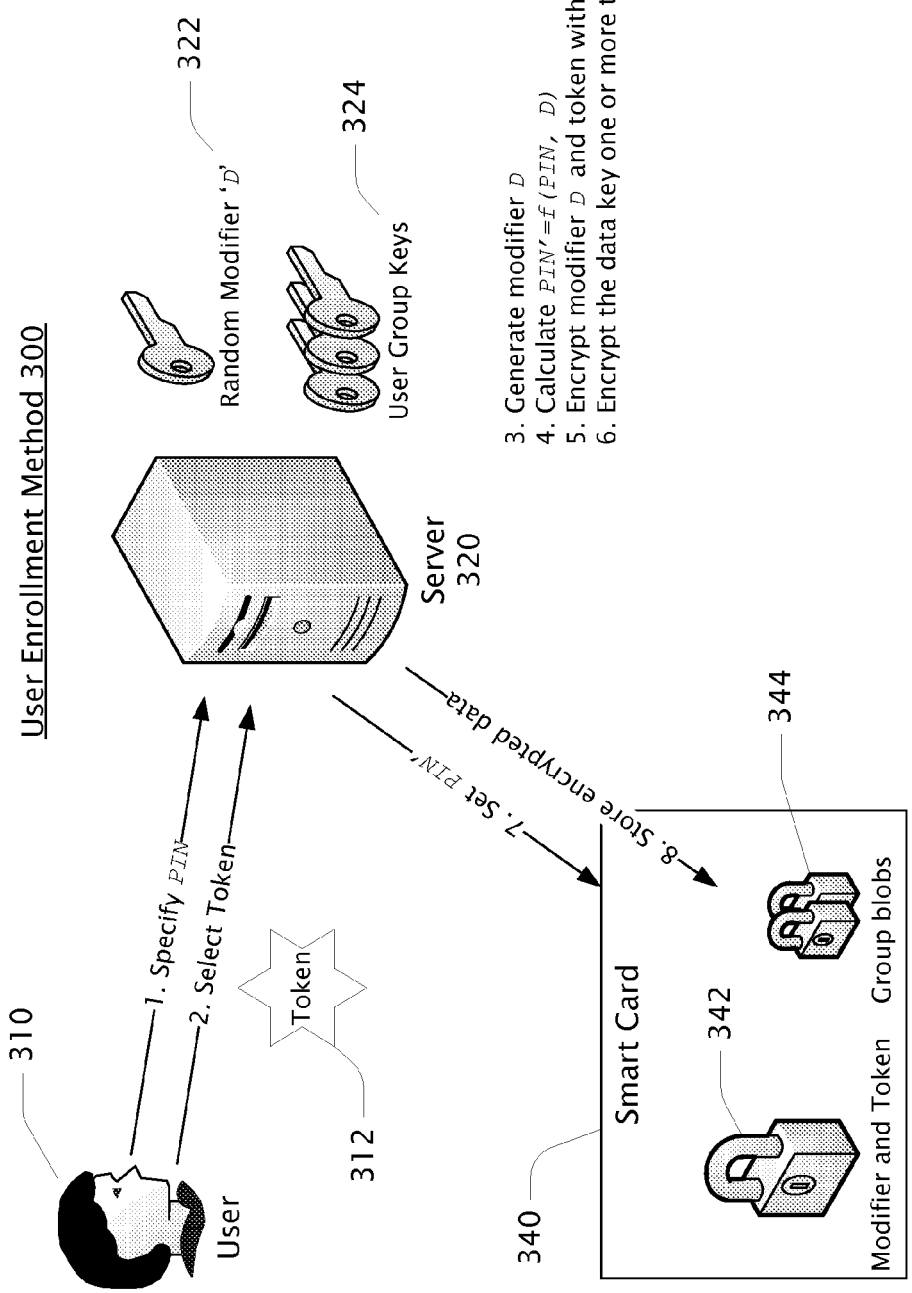
FIG. 3 is a block diagram showing an example user enrollment method.

FIG. 3 is a block diagram showing an example user enrollment method 300. Such a method may be used to configure smart card 340 for use by user 310 with approved clients. An "approved client" is typically a machine, device, environment, or the like such as client 150 described in connection with FIG. 1b that user 110 is authorized to use, that has an approved or authorized system configuration, and/or that is authorized for use within an enterprise. An "unapproved client" is typically any client that user 110 is not authorized to use, that does not have an approved or authorized system configuration, and/or or that is not authorized for use within the enterprise.

Once user enrollment method 300 is complete, user 310 is armed with a PIN and a properly configured smart card that, together, may be successfully used with any approved client. In one example of successful use, a user inserts the configured smart card into a reader of an approved client, enters the associated PIN, and the smart card is unlocked thus allowing the user to successfully cryptographically authenticate or the like. The term "configured smart card" as used herein typically refers to a smart card as configured via method 300 or the like that includes a PIN' value (as opposed to a PIN value), an encrypted token, an encrypted modifier, and one or more encrypted group blobs, where the PIN' value is set for use in unlocking the card.

Steps 1 through 8 shown in FIG. 3 illustrate user enrollment method 300 and are described herein below. Smart card 340 is typically initially un-configured or blank, and is accessible to server 320 or the like via conventional means such that smart card 340 can be configured. Method 300 is typically performed by a server or any other suitable computing environment, such as server 320, computing environments described in connection with FIG. 6 or the like.

Step 1 typically indicates user 310 specifying a PIN to be associated with smart card 340. Such specifying is typically performed via any suitable user interface. The specified PIN is generally required to conform to various conventional security requirements, such as including certain characters, including at least a certain number of characters, being unique over previous PINs, etc. Alternatively, a PIN may be suggested by or provided by server 320 or the like and made available to user 310. Once the PIN is specified, method 300 typically continues at step 2.

Step 2 typically indicates specifying a token 312 for use in future smart card authorization processes, such as described in connection with FIG. 5. Token 312 is typically a data object or the like such as an image, graphic, sound clip, video clip, passphrase, or the like that is hard to reproduce, but easy for a human to validate. In one example, token 312 is a small graphical image or thumbnail, such as a picture of user 310. Such a token may be provided by user 310 or, alternatively, suggested or provided by server 320 or the like. Once token 312 has been specified, method 300 typically continues at step 3.

Step 3 typically indicates generating a high-entropy modifier or number 'D' 322 as described in connection with HNG 153 of FIG. 1b. Once modifier D 322 has been generated, method 300 typically continues with step 4.

Step 4 typically indicates calculating a PIN' value based on the specified PIN and modifier D 322 generated in step 3 and described in connection with FIG. 1b, where PIN'=f(PIN, D) and where PIN is the specified PIN and D is the high-entropy modifier D. Once PIN' is calculated, method 300 typically continues at step 5.

Step 5 typically indicates encrypting modifier D 322 (generated in step 3) and token 312 with a randomly-generated data key ("data key"), resulting in a "modifier and token blob". In one example the data key is a symmetric data key. The modifier D 322 and the token 312 may be encrypted into the same blob or into separate blobs. Once modifier D 322 and token 312 have been encrypted, method 300 typically continues at step 6.

Step 6 typically indicates encrypting the data key of step 5 with each group key. In one example, a group key exists for each group or user group to which user 310 belongs. Generally, user 310 belongs at least to one group representing the enterprise of which he is a part. User 310 may belong to other groups as well, including examples such as, but not limited to, "Accountants", "North American Employees", "Building A Employees", etc. Each group is typically identified with and represented by a group identifier ("ID"). For each group, a group key typically exists or is created, and with each group key the data key is encrypted resulting in a "group blob". For example, given five groups to which user 310 belongs there will typically be five group keys (one for each group) with each key being used to encrypt the data key resulting in five group blobs, each blob being the data key encrypted with one of the group keys. In one example, the group ID is written to a property of the corresponding group blob. Once the data key is encrypted with each group key, method 300 typically continues at step 7.

Step 7 typically indicates setting or securely storing the PIN' value of step 4 on smart card 340 as the smart card's PIN value for unlocking the card, also known herein as configuring the smart card with the prime personal identification number (PIN'). The setting is typically performed in a conventional manner. Once smart card 340 is configured with the PIN' value, method 300 typically continues at step 8.

Step 8 typically indicates securely storing the modifier and token blob of step 5 and the group blobs of step 6—together referred to as encrypted data—on smart card 340. Once the encrypted data is stored on smart card 340, method 300 is typically complete and smart card 340 is properly configured for used with the specified PIN of step 1 and with approved clients as described in connection with FIG. 1b.

Figure 4:
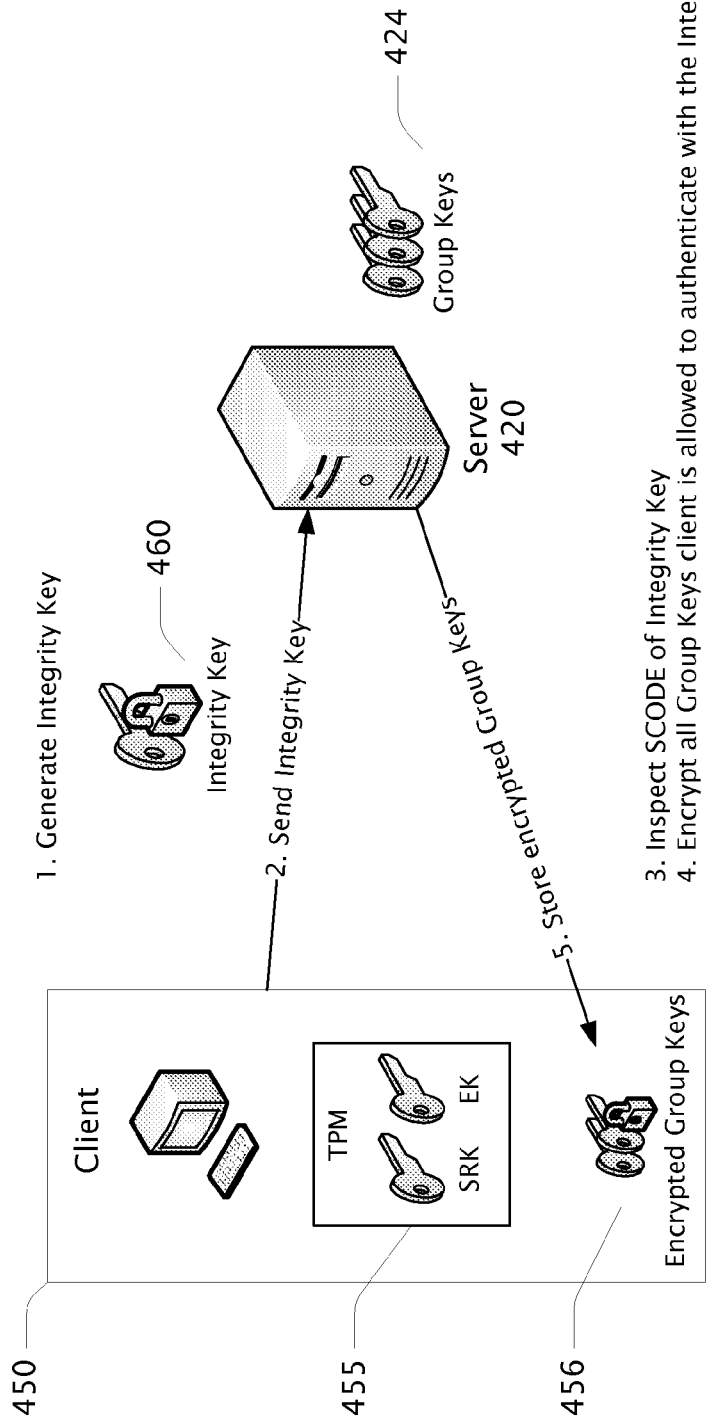
FIG. 4 is a block diagram showing an example client enrollment method.

FIG. 4 is a block diagram showing an example client enrollment method 400. Such a method may be used to configure or enroll client 450 for use with a configured smart card such as smart card 340 described in connection with FIG. 3. One example of client 450 is a modified client, a client with a TPM, such as modified client 150 described in connection with FIG. 1b. Once client enrollment method 400 is complete, client 450 is properly configured for use as an approved client. In one example of successful use, a user inserts a configured smart card into a card reader of client 450, enters the associated PIN, and the smart card is unlocked thus allowing the user to cryptographically authenticate. The terms "enrolled client" and "configured client" as user herein typically refer to a client configured via method 400 that includes a TPM, an integrity key, and one or more group blobs.

Client 450 includes TPM 455 such as TPM 155 described in connection with FIG. 1b. TPM 455 typically includes a storage root key ("SRK") and an endorsement key ("EK") or the like that are securely stored in TPM 455. TPM 455 also typically generates and stores one or more SCODEs such as described in connection with TPM 155 of FIG. 1b. In one example, TPM 455 is a conventional TPM.

Steps 1 through 4 shown in FIG. 4 illustrate client enrollment method 400 and are described herein below. Server 420 is typically an enterprise server or the like operable to access user group keys 424, such as the group keys described in step 6 as described in connection with FIG. 3, and perform method 400. Further, server 420 also typically includes or has access to a list of SCODEs that represent system configurations that are authorized for use. Server 420 may be any suitable computing environment such as computing environment 600 described in connection with FIG. 6 or the like.

Step 1 typically indicates generating and securely storing integrity key 460 on client 450. In one example, client 450 and/or TPM 455 generates integrity key 450 that includes an encrypted SCODE as a private property and the SCODE as a public property of key 450. The included encrypted SCODE typically represents the current system configuration of client 450 (the system configuration of client 450 at the time integrity key 460 is generated) and is encrypted with the SRK or a subordinate key that is ultimately protected by the SRK. The included public property SCODE typically represents the current system configuration of client 450. Once integrity key 460 has been generated and securely stored, method 400 typically continues at step 2.

Step 2 typically indicates sending integrity key 460 to server 420. Once key 460 is received by server 420, method 400 typically continues at step 3.

Step 3 typically indicates inspecting the public property SCODE or the like of integrity key 460 to determine is client 450 has a system configuration that is authorized. Various client system configurations are typically authorized by the enterprise in which they are used. In this manner, only clients that are properly configured are able to complete the client enrollment process. Such a "properly configured client" typically is defined by administrators of the enterprise, or the like. An enterprise may authorize one or more different client system configurations. A client may be any device, system, computing environment, or the like, including but not limited to those such as computing environment 600 described in connection with FIG. 6. If the integrity key represents an authorized system configuration of client 450, method 400 typically continues at step 4.

Step 4 typically indicates encrypting group keys 424, such as user group keys 324 of FIG. 3, with integrity key 460. The result of encrypting is encrypted group keys 456. In one example, group keys 424 represent the user groups that client 450 is allowed to authenticate. Once the appropriate group keys have been encrypted, method 400 typically continues at step 5.

Step 5 typically indicates sending the encrypted group keys 456 to client 450 and securely storing encrypted group keys 356 on client 450. Valid clients, such as properly enrolled client 450, generally only access keys 456 during smart cart authentication such as described in connection with FIG. 5. An attacker cannot generally decrypt keys 456 because its SCODE will be different (if the attacker has an unauthorized system configuration) and thus its integrity key cannot be used to decrypt the encrypted group keys. Once keys 456 have been securely stored on client 450, method 400 is typically complete and client 450 is considered properly enrolled and ready for use with a properly configured smart card, such as smart card 340 of FIG. 3.

Figure 5:
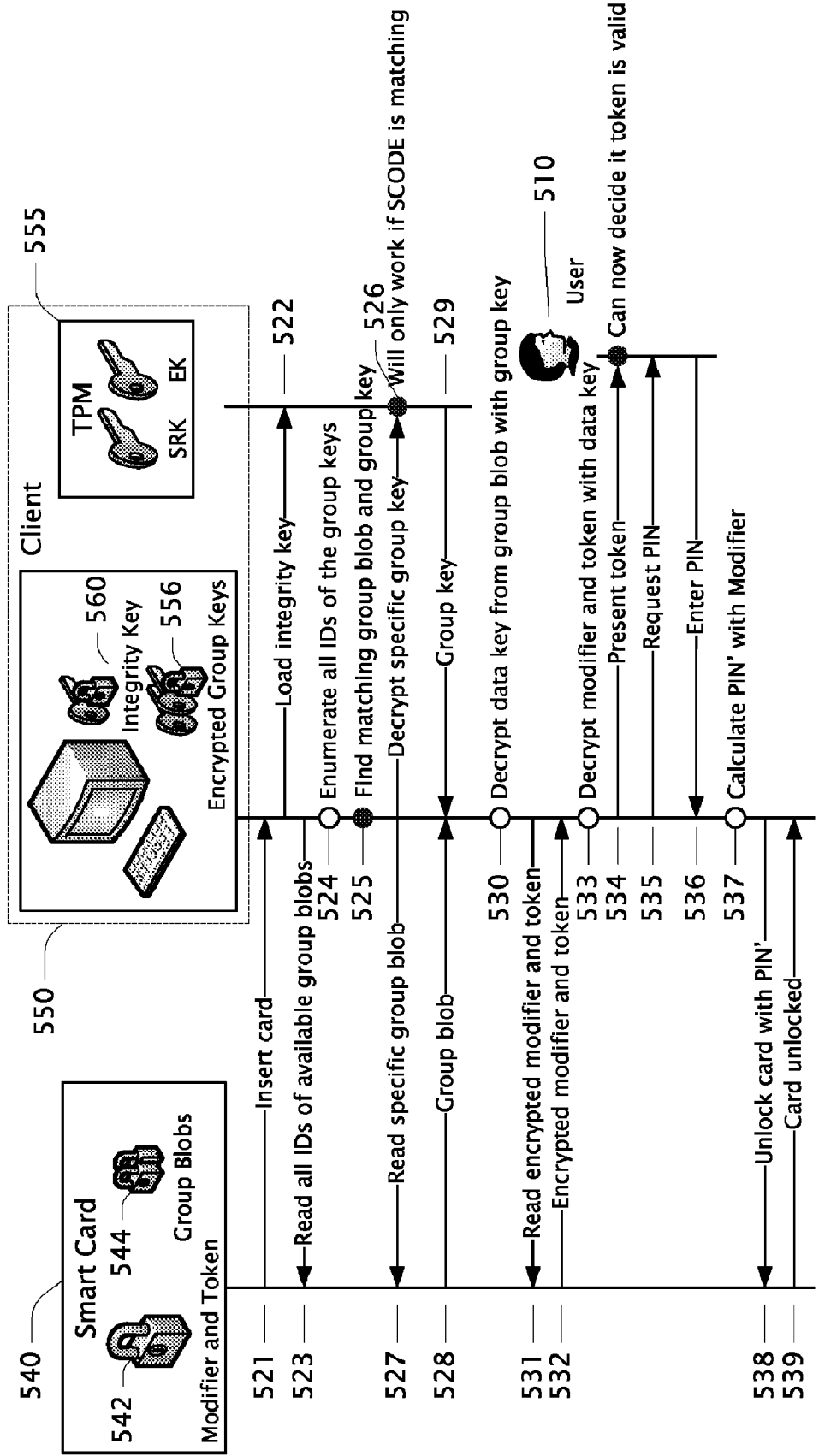
FIG. 5 is a block diagram showing an example smart card authorization method.

FIG. 5 is a block diagram showing an example smart card authorization method 500. Method 500 makes use of smart card 540, a configured smart card such as smart card 340 described in connection with FIG. 3, and client 550, including TPM 555, an enrolled client such as clients 150 and 450 described in connection with FIGS. 1b and 4 respectively. In general, the performance of method 500 includes authenticating enrolled client 550 to user 510 by presenting a token known to the user, accepting a PIN from user 310 intended for use with configured smart card 540, verifying that client 550 is an approved client, and unlocking smart card 540.

Step 521 typically indicates inserting smart card 540 into a card reader or the like of client 550. Alternatively, other means of reading smart card 540 may be employed, such as via electromagnetic or optical coupling or the like. Smart card 540 is typically a card configured during performance of user enrollment method 300 described in connection with FIG. 3. Once smart card 540 is accessible to client 550, method 500 typically continues at step 522.

Step 522 typically indicates loading integrity key 560 from client 550 into TPM 555. Integrity key 560 is typically the key created and securely stored on client 550 during performance of client enrollment method 400 described in connection with FIG. 4. Once loaded, method 500 typically continues at step 523.

Step 523 typically indicates client 550 reading group blobs 544 and their corresponding group identifiers ("IDs") stored on smart card 540. Once the group blobs 544 and IDs from smart card 540 are read into client 550, method 500 typically continues at step 524.

Step 524 typically indicates client 550 enumerating all group IDs from encrypted group keys 556 stored on client 550. Once enumerated, method 500 typically continues at step 525.

Step 525 typically indicates finding at least one group ID from group blobs 544 of smart card 540 that matches a group ID from keys 556 of client 550. A match typically indicates that client 550 is approved for use with at least one group to which user 510 belongs as indicated by smart card 540. If there is no match, then method 500 typically fails. In this manner a user may only authenticate via a client that is approved for use with groups to which the user belongs. If there is a match, then method 500 typically continues at step 526.

Step 526 typically indicates TPM 555 decrypting the matching encrypted group key (per step 525) of keys 556 using integrity key 560 and resulting in a decrypted group key. If the SCODE of the matching group key does not match the current system configuration of client 550 as indicated by TPM 555, then method 500 typically fails. In this manner, a client that has a system configuration that has been altered since client enrollment (such as method 400 described in connection with FIG. 4), or that is not authorized, cannot be used for smart card authentication. Such a client may be been compromised or may be unapproved, and is not allowed to authenticate. If client 550 has a current system configuration that matches the SCODE encrypted in the matching group key, and once the group key is obtained, method 500 typically continues at step 527.

Steps 527 and 528 typically indicate client 550 reading and receiving the matching group blob (of step 525) of blobs 544 from smart card 540. Once read and received, method 500 typically continues at step 529.

Step 529 typically indicates TPM providing the group key (of step 526) to client 550. Once client 550 has the group key and the group blob, method 500 typically continues at step 530.

Step 530 typically indicates client 550 decrypting the matching group blob from smart card 540 (of steps 527 and 528) using the group key (of step 529) resulting in the data key of step 5 of user enrollment method 300 described in connection with FIG. 3. Once the data key is obtained, method 500 typically continues at step 531.

Steps 531 and 532 typically indicate client 550 reading and receiving the encrypted modifier and token 542 from smart card 540. Once read and received, method 500 typically continues at step 533.

Step 533 typically indicates client 550 decrypting the received modifier and token 542 using the data key (of step 530), the decrypting resulting in token 312 (described in step 2 of user enrollment method 300 in connection with of FIG. 3) and the high-entropy modifier D 322 (generated in step 3 of user enrollment method 300 in connection with of FIG. 3). Once the token and value of D have been obtained, method 500 continues at step 534.

Step 534 typically indicates client 550 presenting the token to user 510. If user 510 recognizes the token as token 312 specified during user enrollment method 300 as described in connection with FIG. 3, then user 510 may be assured that client 550 is an approved client with an authorized system configuration, and that it is unlikely that client 550 has been compromised or is unapproved. In this manner client 550 authenticates itself to user 510 prior to the user providing a PIN to unlock smart card 540, thus reducing the probability of the PIN being compromised. Once the token is presented to the user, method 500 continues at step 535.

Step 535 typically indicates client 550 requesting a PIN for smart card 540 from user 510. The requested PIN is the specified PIN described in step 1 of user enrollment method 300 in connection with of FIG. 3. Once the PIN is requested, method 500 typically continues at step 536.

Step 536 typically indicates user 510 providing a PIN value. If user 510 did not recognize the token (of step 534), the user may not enter the PIN as the user may assume client 550 cannot be trusted. If user 510 did recognize the token, the user may enter the requested PIN (of step 535). Once the PIN is entered, method 500 typically continues at step 537.

Step 537 typically indicates client 550 calculating a PIN' value based on the user-provided PIN (of step 536) and the D value (of step 533) as described in step 5 of user enrollment method 300 in connection with of FIG. 3. Once the PIN' value is calculated, method 500 typically continues at step 538.

Step 538 typically indicates client 550 attempting to unlock smart card 540 using PIN' (of step 537). If the values of the user-provided PIN (of step 536) and/or the D value (of step 533) are incorrect (such as user 510 entering the wrong PIN), then the calculated PIN' will fail to unlock smart card 540. If the PIN' value is correct, then smart card 540 will successfully unlock. Once smart card 540 is unlocked, method 500 typically continues at step 539.

Step 539 typically indicates client 550 accessing unlocked cryptographic data and the like from smart card 540. At this point smart card authorization method 500 is complete.

Figure 6:
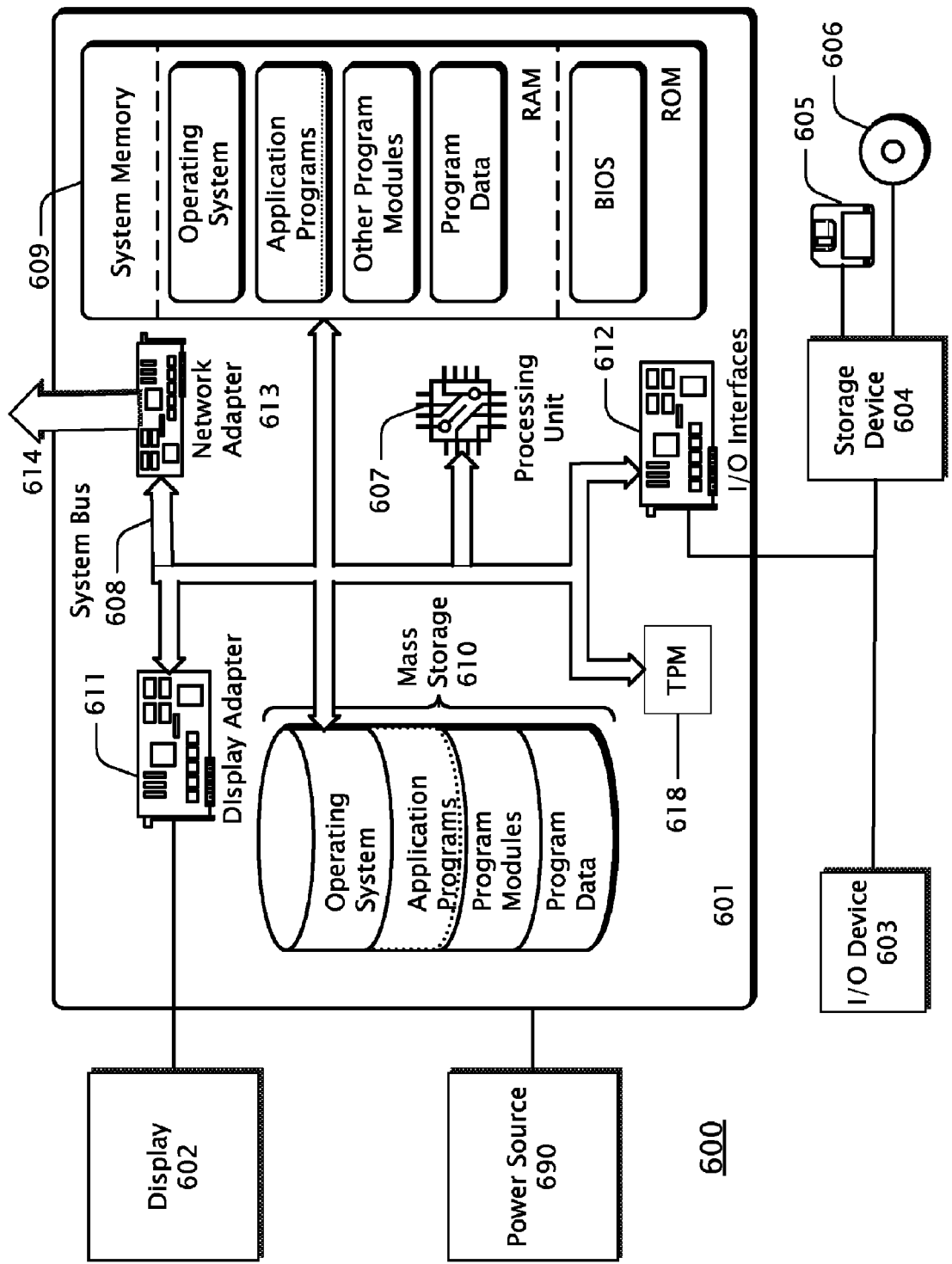
FIG. 6 is a block diagram showing an example computing environment in which the technologies described herein may be implemented.

FIG. 6 is a block diagram showing an example computing environment 600 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 600 typically includes a general-purpose computing system in the form of a computing device 601 coupled to various components, such as peripheral devices 602, 603, 604 and the like. System 600 may couple to various other components, such as input devices 603, including voice recognition, touch pads, buttons, keyboards and/or pointing devices, such as a mouse or trackball, via one or more input/output ("I/O") interfaces 612. The components of computing device 601 may include one or more processors (including central processing units ("CPU"), graphics processing units ("GPU"), microprocessors ("µP"), and the like) 607, system memory 609, and a system bus 608 that typically couples the various components. Processor 607 typically processes or executes various computer-executable instructions to control the operation of computing device 601 and to communicate with other electronic and/or computing devices, systems or environment (not shown) via various communications connections such as a network connection 614 or the like. System bus 608 represents any number of several types of bus structures, including a memory bus or memory controller, a peripheral bus, a serial bus, an accelerated graphics port, a processor or local bus using any of a variety of bus architectures, and the like.

System memory 609 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 609 typically stores data, computer-executable instructions and/or program modules comprising computer-executable instructions that are immediately accessible to and/or presently operated on by one or more of the processors 607.

Mass storage devices 604 and 610 may be coupled to computing device 601 or incorporated into computing device 601 via coupling to the system bus. Such mass storage devices 604 and 610 may include non-volatile RAM, a magnetic disk drive which reads from and/or writes to a removable, non-volatile magnetic disk (e.g., a "floppy disk") 605, and/or an optical disk drive that reads from and/or writes to a non-volatile optical disk such as a CD ROM, DVD ROM 606. Alternatively, a mass storage device, such as hard disk 610, may include non-removable storage medium. Other mass storage devices may include memory cards, memory sticks, tape storage devices, and the like.

Any number of computer programs, files, data structures, and the like may be stored in mass storage 610, other storage devices 604, 605, 606 and system memory 609 (typically limited by available space) including, by way of example and not limitation, operating systems, application programs, data files, directory structures, computer-executable instructions, and the like.

Output components or devices, such as display device 602, may be coupled to computing device 601, typically via an interface such as a display adapter 611. Output device 602 may be a liquid crystal display ("LCD"). Other example output devices may include printers, audio outputs, voice outputs, cathode ray tube ("CRT") displays, tactile devices or other sensory output mechanisms, or the like. Output devices may enable computing device 601 to interact with human operators or other machines, systems, computing environments, or the like. A user may interface with computing environment 600 via any number of different I/O devices 603 such as a touch pad, buttons, keyboard, mouse, joystick, game pad, data port, and the like. These and other I/O devices may be coupled to processor 607 via I/O interfaces 612 which may be coupled to system bus 608, and/or may be coupled by other interfaces and bus structures, such as a parallel port, game port, universal serial bus ("USB"), fire wire, infrared ("IR") port, and the like.

Computing device 601 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 601 may be coupled to a network via network adapter 613 or the like, or, alternatively, via a modem, digital subscriber line ("DSL") link, integrated services digital network ("ISDN") link, Internet link, wireless link, or the like.

Communications connection 614, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Trusted platform module ("TPM") 618, also known as a "TPM chip" and TPM security device", is typically integrated with device 601 and includes a cryptographic processor that provides a root of trust for reporting the integrity of device 601, and a root of trust for the storage of secrets. In one example, TPM 618 provides facilities for secure generation of cryptographic keys and a means for generating high-entropy numbers. Example TPM 618 also includes capabilities such as remote attestation and sealed storage. Remote attestation creates an unforgeable summary of the hardware, boot, and operating system configuration ("system configuration") of device 601, allowing a third party (such as an authentication system as described herein) to verify that the system configuration has not been changed, an example of reporting device integrity. Sealing encrypts data in such a way that it may be decrypted only in the exact same state (that is, it may be decrypted only on the device it was encrypted running the same software). One such TPM is defined by the TPM Work Group, under the auspices of the Trusted Computing Group. Note that such a TPM may not be present in conventional computing environments or the like.

Power source 690, such as a battery or a power supply, typically provides power for portions or all of computing environment 600. In the case of the computing environment 600 being a mobile device or portable device or the like, power source 690 may be a battery. Alternatively, in the case computing environment 600 is a desktop computer or server or the like, power source 690 may be a power supply designed to connect to an alternating current ("AC") source, such as via a wall outlet.

Some mobile devices may not include many of the components described in connection with FIG. 6. For example, an electronic badge may be comprised of a coil of wire along with a simple processing unit 607 or the like, the coil configured to act as power source 690 when in proximity to a card reader device or the like. Such a coil may also be configure to act as an antenna coupled to the processing unit 607 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 602, I/O device 603, or many of the other components described in connection with FIG. 6. Other mobile devices that may not include many of the components described in connection with FIG. 6, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method of authentication using a configured smart card with a configured client, the configured client including a trusted platform module, the method comprising:
    generating an integrity key that comprises a system code that uniquely identifies a state of the configured client and that is held tamperproof by the trusted platform module, wherein the integrity key is generated based on the system code and based on a storage root key that is held secret by the trusted platform module and based on a modifier, and wherein the integrity key is securely stored on the configured client;

receiving, by the configured client, an encrypted modifier from the configured smart card, wherein the encrypted modifier is the modifier encrypted using the integrity key;

decrypting the received encrypted modifier using the integrity key that is securely stored on the configured client;

receiving, by the configured client from a user, a personal identification number;

calculating a prime personal identification number based on the received personal identification number and the decrypted modifier; and unlocking the configured smart card using the calculated prime personal identification number, wherein the unlocking is based on the calculated prime personal identification number matching a previously-set prime personal identification number of the configured smart card.

2. The method of claim 1 further comprising verifying that a current system configuration of the configured client matches the state of the configured client uniquely identified by the system code.

3. The method of claim 2 wherein the trusted platform module performs the verifying.

4. The method of claim 1 wherein the decrypting comprises:

decrypting a data key (instead of the modifier) using the integrity key that is securely stored on the configured client, wherein the data key is derived from data received from the configured smart card; and decrypting the received encrypted modifier using the key.

5. The method of claim 1 wherein the calculating is based on an equation of the form PIN'=f(PIN,D) where PIN is the personal identification number, D is the modifier, and PIN' is the prime personal identification number.

6. The method of claim 5 wherein the equation generates PIN' to conform to a format requirement of the configured smart card.

7. The method of claim 1 wherein the modifier is a high-entropy number.

8. The method of claim 1 wherein the configured smart card is a conventional smart card.

9. The method of claim 1 embodied as computer-executable instructions stored on a computer-readable storage device.

* * * * *

UNITED STATES PATENT AND TRADEMARK OFFICE
CERTIFICATE OF CORRECTION

| | | Page 1 of 1 |
|---|---|---|
| PATENT NO. | : 7,934,096 B2 | |
| APPLICATION NO. | : 11/829737 | |
| DATED | : April 26, 2011 | |
| INVENTOR(S) | : Stefan Thom et al. | |

It is certified that error appears in the above-identified patent and that said Letters Patent is hereby corrected as shown below:

In column 13, line 7, in Claim 1, delete "key:" and insert -- key; --, therefor.

Signed and Sealed this
Nineteenth Day of July, 2011

David J. Kappos
*Director of the United States Patent and Trademark Office*